(12) United States Patent
Collins et al.

(10) Patent No.: US 7,791,591 B2
(45) Date of Patent: Sep. 7, 2010

(54) OPTICAL MOUSE USING VCSELS

(75) Inventors: Douglas Collins, Albuquerque, NM (US); Neinyi Li, Albuquerque, NM (US)

(73) Assignee: Emcore Corporation, Albuquerque, NM (US)

( * ) Notice: Subject to any disclaimer, the term of this patent is extended or adjusted under 35 U.S.C. 154(b) by 1069 days.

(21) Appl. No.: 11/499,210

(22) Filed: Aug. 4, 2006

(65) Prior Publication Data

US 2008/0030472 A1    Feb. 7, 2008

(51) Int. Cl.
G06F 3/033 (2006.01)
G09G 5/08 (2006.01)

(52) U.S. Cl. ...................................... 345/166
(58) Field of Classification Search ............... 345/166
See application file for complete search history.

(56) References Cited

U.S. PATENT DOCUMENTS

| | | | | |
|---|---|---|---|---|
| 6,185,241 B1 * | 2/2001 | Sun | ............................. | 372/96 |
| 6,751,245 B1 * | 6/2004 | Wasserbauer et al. | ..... | 372/46.01 |
| 6,927,758 B1 * | 8/2005 | Piot et al. | .................... | 345/166 |
| 7,042,575 B2 * | 5/2006 | Carlisle et al. | .............. | 356/498 |
| 7,126,586 B2 * | 10/2006 | Jianping et al. | ............. | 345/166 |
| 2004/0212805 A1 * | 10/2004 | Wang et al. | .................. | 356/445 |
| 2004/0233963 A1 * | 11/2004 | Hooper et al. | ................ | 372/99 |
| 2004/0264531 A1 * | 12/2004 | Ryou et al. | .................... | 372/45 |
| 2005/0168445 A1 * | 8/2005 | Piot et al. | ..................... | 345/163 |
| 2006/0072102 A1 * | 4/2006 | Jianping et al. | ............ | 356/28.5 |
| 2006/0214909 A1 * | 9/2006 | Poh et al. | ..................... | 345/156 |

FOREIGN PATENT DOCUMENTS

WO   WO 0045483 A1 *  8/2000

* cited by examiner

*Primary Examiner*—Richard Hjerpe
*Assistant Examiner*—Andrew Schnirel

(57) ABSTRACT

An optical mouse for controlling a cursor on a display. The mouse emits a light beam that interacts with a target surface and receives reflected light therefrom to detect movement of the mouse. The mouse includes a housing, a single-mode VCSEL disposed within the housing for emitting the light beam through a surface of the housing, the emitted light interacting with the target surface, a photodetector disposed within the housing that receives the light reflected from the target surface and that provides an electrical output and a processor that receives the electrical output and calculates a value that is indicative of the amount and direction of movement of the optical mouse relative to the target surface.

9 Claims, 3 Drawing Sheets

OPTICAL MOUSE USING VCSELS

FIELD OF THE INVENTION

The field of the invention relates to computer displays and more particularly to cursor control devices.

BACKGROUND OF THE INVENTION

The computer cursor is one of the most well known features of a computer display. Typically, the cursor is placed over a symbol of a program feature on the display and a switch associated with the cursor is activated to select the feature.

A number of different control devices have been developed to control the movement of the cursor. Examples include touch panels, joysticks or the computer mouse.

Touch panels and joysticks are typically located on the keyboard of a computer terminal while a computer mouse is separate from the keyboard and is, instead, directly connected to the CPU. In the IBM Thinkpad, the cursor switch is located directly below the space bar with the touch panel located below the cursor switch. In contrast, the joystick is surrounded on the keyboard by the letters g, b and h.

Since the joystick is surrounded by keys on a keyboard, the user must be careful not to activate any inappropriate nearby keys when the joystick is used. While the touch panel is somewhat easier to use, the cursor can only be moved a limited distance for each movement of a user's finger across the touch panel.

In contrast, a computer mouse can be placed in any location near the user. Since the mouse is separate from the keyboard, it can be more easily used without fear of activating the wrong key and without the distance limitations of a touch panel.

In order to move the cursor, internal circuitry of the mouse detects movement of the mouse across a supporting surface and translates that movement into cursor movement. In older devices, movement of the mouse is detected via a ball located inside the mouse. A set of encoder wheels placed ninety degrees apart make contact with the ball, thereby detecting movement of the ball and generating the signals controlling the x and y movement of the cursor. The encoders connected to the encoder wheels generate a pair of quadrature signals that is used to detect a direction of movement of the mouse.

In more recent devices, movement of an optical mouse is detected by moving the mouse over a control surface having a grid printed on the control surface. One or more light sources are provided within the mouse to direct light onto the grid. Reflected light from the grid is directed onto photodetectors within the optical mouse to detect movement of the mouse over the grid. By placing the photdetectors a predetermined distance apart, quadrature signals can again be provided as an indication of direction.

While the light sources and photodetectors of optical mice are a significant improvement over the use of a ball within the mouse, conventional light sources and photodectors are unnecessarily complex and inefficient. Because of the importance of computer mice, a need exists for means for detecting movement that are less complex and more efficient.

SUMMARY

An optical mouse for controlling a cursor on a display. The mouse emits a light beam that interacts with a target surface and receives reflected light therefrom to detect movement of the mouse. The mouse includes a housing, a single-mode VCSEL disposed within said housing for emitting the light beam through a surface of the housing, the emitted light interacting with the target surface, a photodetector disposed within the housing that receives the light reflected from the target surface and that provides an electrical output and a processor that receives the electrical output and calculates a value that is indicative of the amount and direction of movement of the optical mouse relative to the target surface.

DETAILED DESCRIPTION OF AN ILLUSTRATED EMBODIMENT

Figure 1:
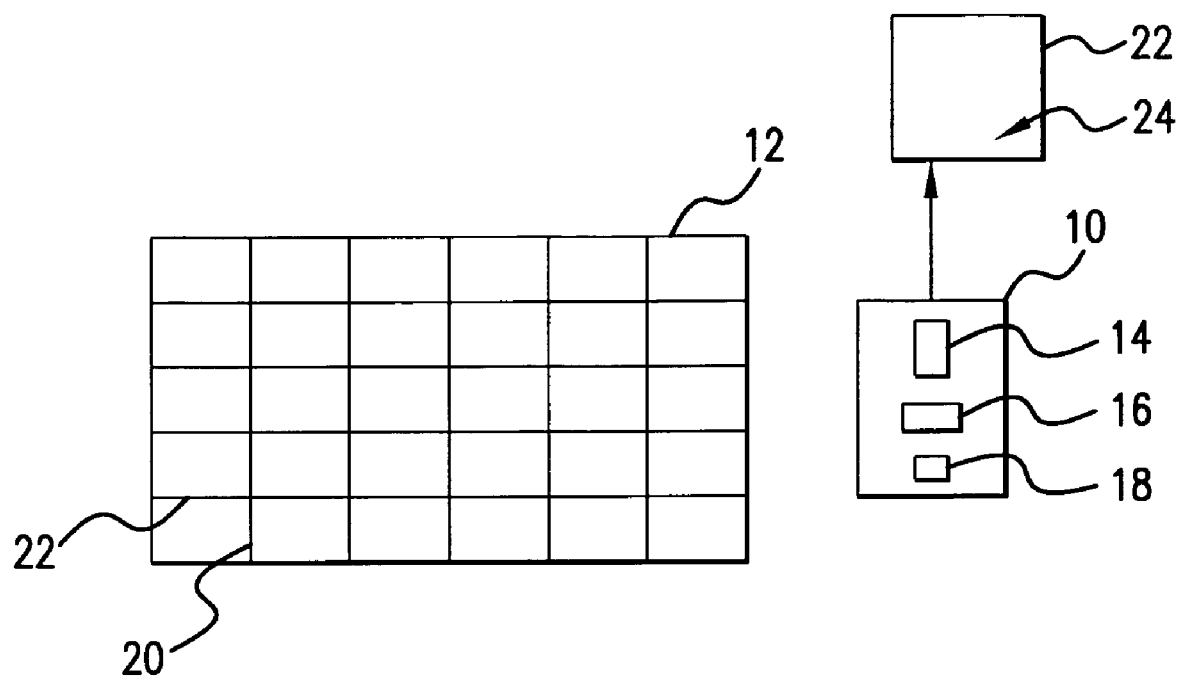
FIG. 1 depicts a top view of an optical mouse in a context of use with a control surface and computer.

Details of the present invention will now be described, including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of actual embodiments nor the relative dimensions of the depicted elements, and are not drawn to scale.

FIG. 1 depicts an optical mouse 10 and a target or control surface 12 in accordance with illustrated embodiments of the invention. The control surface 12 includes a two-dimensional repeating pattern of reference features. For example, the reference features may be comprised of a grid pattern including a first and second set of regularly spaced, light absorbing lines 20, 22 separated by reflecting surfaces, where the lines and reflecting surfaces are of equal width and where the second set of lines are arranged at a ninety degree angle with respect to the first set of lines. Alternatively, the two-dimensional repeating pattern could be a pattern of circles or any other geometric shape and arrangement.

The optical mouse 10 may include first and second detector arrays 14, 16. The first array 14 provides a quadrature signal in response to movement of the mouse 10 over the control surface 12 in the x-direction and the second array 16 provides a quadrature signal in response to movement of the mouse 10 over the control surface 12 in the y-direction.

Also included within the mouse 10 may be a signal processor 18. The signal processor 18 accepts the quadrature signals from the first and second arrays 14, 16 and calculates a distance and direction of movement of the mouse 10 in the x and y directions. The calculated distance and directions of movement are transferred to a computer 22 where the distances and directions are used to adjust a position of a cursor 24.

Figure 2:
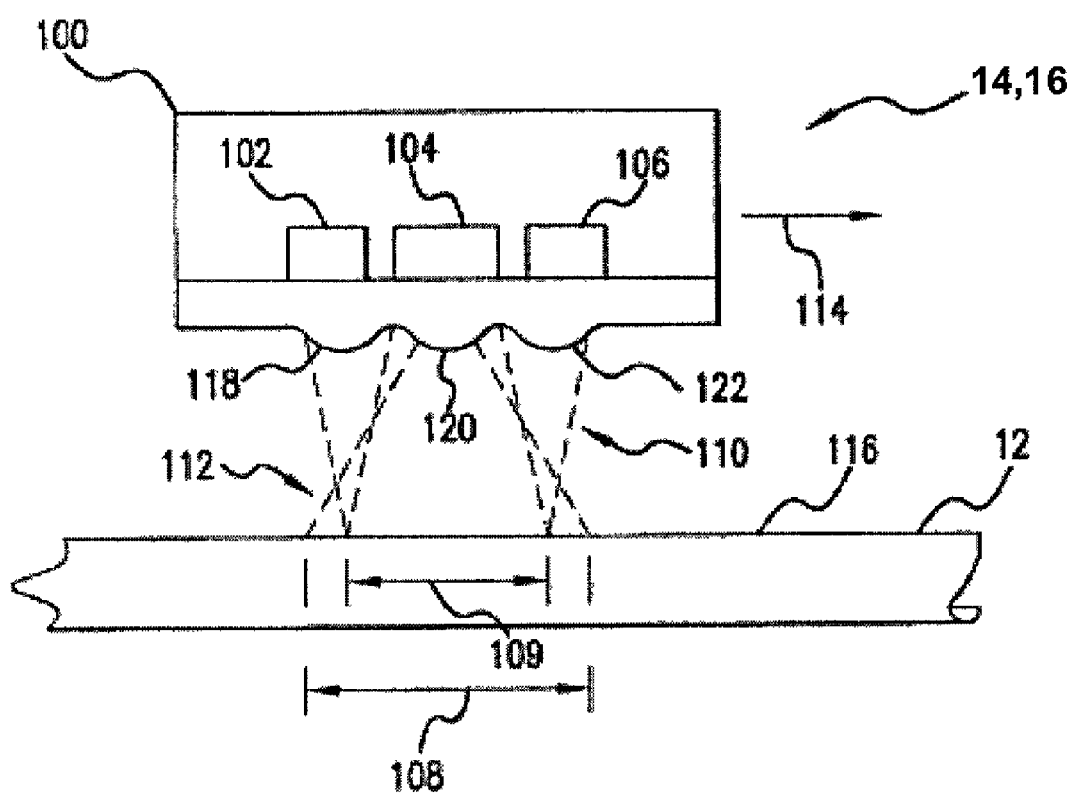
FIG. 2 depicts a transducer that may be used by the optical mouse of FIG. 1.

FIG. 2 depicts one of the detector arrays 14, 16. It may be assumed that the arrays 14, 16 are substantially identical except that a first array 14 is oriented at a ninety degree angle with respect to the second array 16.

The detector arrays 14, 16 may be fabricated as a single chip 100 or may be a composite of light sources and detectors. As shown in FIG. 2, the detector arrays 14, 16 each include at least one light source 104 and two reference photodetectors 102, 106.

The light source 104 of the detector arrays 14, 16 emits light through a bottom surface of the housing of the mouse 10 onto a radiation collection area 112 of the control surface 12.

As the mouse 10 is moved across the control surface 12, the emitted light interacts with the control surface 12 and is reflected and modulated by the light absorbing and reflecting areas. The radiation collection area 112 on the control surface 12 is of a relatively constant size because of direct contact between the housing of the mouse 10 and the control surface 12 and because the direct contact maintains the detector arrays 14, 16 at a constant distance from the control surface 12.

The radiation collection areas 112 have a length 110 and width 108 that roughly corresponds to the length and width of the array 14, 16. The length 110 (i.e., the direction measured into the page of FIG. 2) of each radiation collection area 112 is equal to a reference feature period (or greater in length by an integral number of reference feature periods). It should be understood in this regard, that the light source 104 and photodetectors 102, 106 shown in FIG. 2 may be replicated (in the direction proceeding into the page) and connected in parallel if necessary to create a radiation collection area 112 with a length 110 equal to the reference feature period (or integral number of reference feature periods). It should also be understood that one or more lenses 118, 120, 122 may be used in conjunction with the respective light source 104 and photodetectors 102, 106 to achieve a desired dimension of the radiation collection area 112.

The period of the reference feature is equal to the sum of the width of a light absorbing feature plus the width of a corresponding reflecting feature. Where the reference feature is a grid, the reference period feature is the width of the light absorbing line plus the width of the adjacent reflecting surface.

The width 108 of each radiation collection area 112 is equal to or narrower than the width of a reference feature. As above, where the reference feature is a grid, the width 108 of the radiation collection area 112 is equal to or less than the width of the light absorbing line or the width of the reflecting surface between the lines. The photodetectors 102, 106 are separated in the width dimension by a distance 109 equal to one-quarter of a reference feature period (i.e., one-half the width of the reference feature).

As noted above, the detector array 14 detects motion in the x-direction and detector array 16 detects motion in the y-direction. As also noted above, the detector array 14 has a radiation collection width 108 in the x-direction equal to one-half a reference feature period and a radiation collection length 108 equal to an integral multiple of the reference feature period. Since the detector array 14 has a width 108 equal to one-half the reference feature period and a length equal to a multiple of the reference feature period, the detector array 14 provides modulation in the x-direction, but does not provide any modulation in the y-direction. Similarly, the detector array 16 has a width 108 that is equal to one-half of a reference feature period in the y-direction and a length equal to a multiple of the reference feature period and therefore provide modulation in the y-direction, but does not provide any modulation in the x-direction.

The output of the detector arrays 14, 16 are quadrature signals. For example, if the mouse 10 is moved to the right, as indicated by arrow 114 in FIG. 2 and reflective area 116 were encountered, then light from source 104 would be reflected by the reflective area 116 and would activate photodetector 106. As the mouse 10 continued to move to the right, the second photodetector 102 would also become activated. As the mouse 10 continues to move to the right, the first photodector 106 would become deactivated. As the reflective area 116 passes completely out of the width 108, both photodetectors 102, 106 would become deactivated.

By choosing the separation distance 109 of the photodetectors 102, 106 to be equal to one-quarter of the reference feature period, the output of the photodetectors 102, 106 of the detector arrays 14, 16 is a quadrature signal. In this example, activation of the photodetector 106 is ninety degrees ahead of activation of the photodetector 102, thereby indicating that the mouse 10 is moving to the right. Similarly, if the mouse 10 moves to the left then, the photodetector 102 is activated ninety degrees ahead of the photodetector 106.

The quadrature signals from the transducer arrays 14, 16 are transferred to the signal processor 18. Within the signal processor 18, the quadrature signals are processed to determine a distance and direction of movement. For example, an x-axis direction processor within the signal processor 18 may receive a signal from the transducer 14 and determine a direction of movement of the mouse 10 along the x-axis. The x-axis direction processor may do this by determining which photodetector 102, 106 was activated first as the mouse 10 passes over each reference feature. An x-axis totalizing processor may increment or decrement an internal position counter based upon the direction provided by the x-axis direction processor and upon the sequential detection of each reference feature by the photodetectors 102, 106.

Similarly, a y-axis direction processor may determine a direction based upon which photodetector 102, 106 was activated first as the mouse 10 passes over each reference feature. A y-axis totalizing processor may increment or decrement an internal position counter based upon the direction provided by the y-axis direction processor and upon the sequential detection of each reference feature by the photodetectors 102, 106.

The calculated distances and directions along the x and y axis are, in turn, sent to the computer 22. Within the computer 22 the position of the cursor 24 may be adjusted accordingly based upon the calculated distances and directions.

In another embodiment of the invention, the arrays 14, 16 may be combined. The arrays 14, 16 may be combined by placing a single VCSEL 104 in the center of the array and sets of x and y photodetectors 102, 106 extending outwards from the single VCSEL 104 orthogonally.

In still another embodiment, rather than the VCSEL 104 having the arrangement shown in FIG. 2, the VCSEL 104 is located on one side of the photodetectors 102, 106. In this case, a lens 120 may be used to direct the light from the VCSEL 104 downward at the proper angle so that the reflective point from the two photodiodes 102, 106 is one-fourth of a reference feature apart.

Turning now to the arrays 14, 16, the photodetectors 102, 106 may be conventional. In contrast, the light sources 104 are single mode VCSLs. The use of single mode VCSELs as light sources 104 offer a number of advantages over conventional laser diodes.

For example, multimode VCSELs generate significantly more heat than single mode VCSELs. Heat within a computer mouse 10 tends to make the mouse 10 uncomfortable to hold and use.

In addition, there is no easy way to dissipate heat within a mouse 10. In this regard, all of the external surfaces of a mouse 10 must be comfortable to the touch.

The use of single mode VCSELs significantly reduces heat generated within the mouse 10. The generation of less heat allows the mouse 10 to be made smaller and also allows associated devices (e.g., the processor 18) to be located within the mouse 10.

Figure 3:
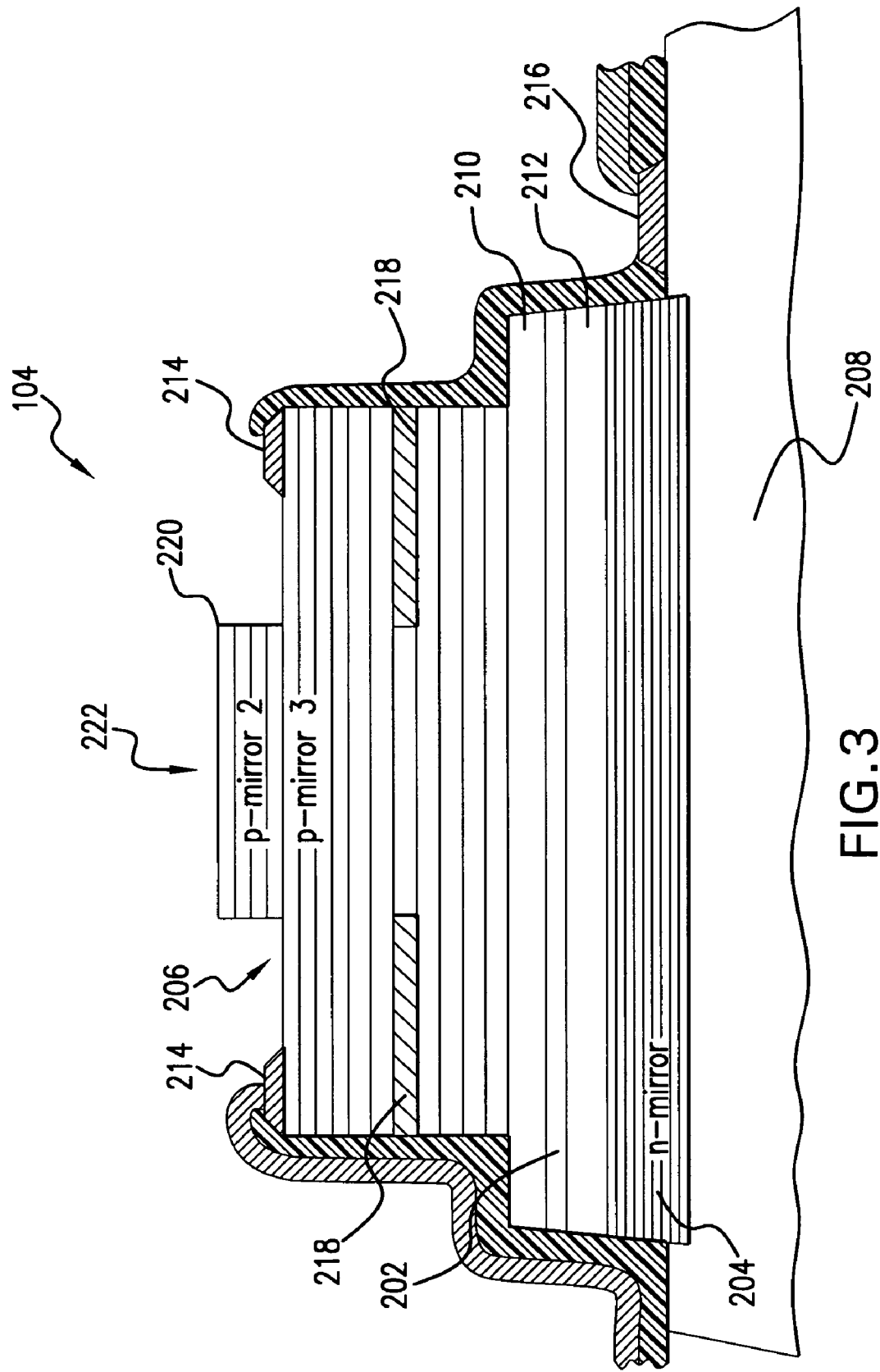
FIG. 3 depicts a VCSEL that may be used in the transducer of FIG. 2.

Referring to FIG. 3 there is shown a fragmentary, cross-sectional view of the single mode VCSEL 104. In particular, the VCSEL 104 may include a laser cavity region 202 that is defined between a first semiconductor region 204 that forms a first mirror stack and a second semiconductor region 206 that forms a second mirror stack. The semiconductor regions 204 and 206 are disposed on a substrate 208 which may be typically p-type gallium arsenide. The cavity region 202 includes one or more active layers (e.g., a quantum well or one or more quantum dots). The active layers may be formed from any of a number of different quantum well layer compositions. The active layers may be sandwiched between a pair of spacer layers 210, 212. Electrical contacts 214, 216 are provided to the structure to enable a suitable driving circuit to be applied to the VCSEL 104.

In operation, an operating voltage would be applied to the electrical contacts to produce a current flow in the semiconductor structure. The current will flow through a central region of the semiconductor structure resulting in lasing in a central portion of cavity region 202. A confinement region defined by a surrounding oxide region 218 or ion implanted region, or both, provides lateral confinement of carriers and photons. The relatively high electrical resistivity of the confinement region causes electrical current to be directed to and flow through a centrally located region of the semiconductor structure. In particular, in the oxide VCSEL, optical confinement of photons results from an index profile that guides photons that are generated in cavity region 202. The carrier and optical lateral confinement increases the density of carriers and photons within the active region and increases the efficiency with which light is generated within the active region.

The confinement region 218 circumscribes a central region of the VCSEL 104, which defines an aperture through which VCSEL current preferably flows. In other embodiments, oxide layers may be used as part of the distributed Bragg reflectors in the VCSEL structure.

The first and second mirror stacks 204 and 206 respectively each includes a system of alternating layers of different refractive index materials that forms a distributed Bragg reflector (DBR). The materials are chosen depending upon the desired operating laser wavelength (e.g., a wavelength in the range of 650 nm to 1650 nm). For example, first and second mirror stacks 204, 206 may be formed of alternating layers of high aluminum content AlGaAs and low aluminum content AlGaAs. The layers of first and second mirror stacks 204, 206, preferably have an effective optical thickness (i.e., the layer thickness multiplied by the refractive index of the layer) that is about one-quarter of the operating laser wavelength.

A generally cylindrical, reduced diameter mirror extension portion 220 is provided in the top layers of the second mirror stack 206. The use of the mirror extension portion 220 represents an intra-cavity approach that reduces the series resistance of the VCSEL 104 thereby improving current injection. The mirror extension 220 provides an optical aperture that ensures single-mode operation over a desired operating temperature and current range. In other embodiments, the mirror extension includes an undoped distributed Bragg reflector.

The size of the optical aperture is designed to be smaller than that of the current aperture, therefore, higher order modes are spatially suppressed. By optimizing current injection, spatial hole burning effect can be minimized to sustain single-mode operation across wide operating current and temperature ranges. Because the lateral optical confinement is decoupled from the lateral current confinement, single mode operation can be achieved with larger oxide apertures. This gives a more reliable device and one with a higher electrostatic discharge (ESD)/electrical overstress (EOS) damage threshold.

The diameter and height of the mirror extension 220 may be chosen to be in the order of 4 to 5 microns and 0.2 to 1.5 microns, respectively to ensure only coupling the fundamental mode of optical energy into the optical aperture 222. Higher order transverse modes are thus suppressed due to increasing loss and improved current injection.

The current aperture in the device 104 is confined by an oxidation layer. Since the optical aperture size is in the same scale as the fundamental mode spatial distribution, the current aperture may be up to 10 microns in diameter. Compared to the commonly used 4 microns or less oxide VCSELs, ESD voltage limits are significantly improved.

While the invention has been illustrated and described as embodied in an optical mouse using single mode VCSEL devices, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

The invention claimed is:

1. An optical mouse that interacts with a control surface to detect movement comprising:
   a housing;
   a single-mode VCSEL disposed within said housing that emits light through a bottom surface of the housing, the emitted light interacting with a set of reference features of the control surface that reflect and modulate the emitted light; and
   a first photodetector disposed within the housing proximate the VCSEL that receives the modulated light reflected from the control surface; and
   a second photodetector disposed within the housing proximate the VCSEL and offset laterally from the first photodetector by a distance equal to an integer multiple of one-fourth of a distance between respective reference features of the control surface, said first and second photodetectors providing an electrical output that is indicative of the amount and direction of movement of the optical mouse relative to the control surface.

2. The optical mouse as in claim 1 wherein the single-mode VCSEL further comprises a substrate with top and bottom surfaces, a first stack of mirror layers of alternating indices of refraction located upon the top surface of the substrate, an active layer disposed over the first stack and a second stack of mirror layers of alternating indices of refraction disposed over the active layer, said second stack of mirror layers having a first diameter adjacent the active layer and a step change to a second reduced diameter on a distal end.

3. The surface emitting laser as in claim 2 further comprising an annular contact disposed around the second stack of mirror layers on a surface of the step change from the first diameter to the second diameter.

4. The surface emitting laser as in claim 2 wherein mirror layers within the second reduced diameter further comprises an undoped distributed Bragg reflector.

5. The surface emitting laser as in claim 2 wherein mirror layers within the second reduced diameter further comprises a dielectric distributed Bragg reflector.

6. The surface emitting laser as in claim 2 wherein the second reduced diameter further comprises 4 to 5 micrometers.

7. The surface emitting laser as in claim 2 wherein the mirror layers within the second reduced diameter further comprises a height of approximately 0.2 to 1.5 micrometers.

8. An optical mouse that interacts with a control surface to detect movement comprising:

a housing;

an array having a single-mode VCSEL disposed within said housing where said VCSEL emits light through a bottom surface of the housing, the emitted light interacting with a set of reference features of the control surface that reflect and modulate the emitted light; and first and second photodetectors of the array proximate the VCSEL that receive the modulated light reflected from the control surface, the second photodetector offset laterally from the first photodetector by a distance equal to an integer multiple of one-fourth of a distance between respective reference features of the control surface, said first and second photodetectors providing an electrical output that is indicative of the amount and direction of movement of the optical mouse relative to the control surface.

9. The optical mouse as in claim 8 further comprising a processor that determines a distance and direction of movement of the mouse from the electrical outputs of the first and second photodetectors.

* * * * *